United States Patent
Li et al.

(10) Patent No.: US 11,240,955 B2
(45) Date of Patent: Feb. 8, 2022

(54) METHOD FOR CONSTRUCTING A MIXED FOREST OF YEW TREES AND FIG TREES

(71) Applicant: Northeast Forestry University, Heilongjiang (CN)

(72) Inventors: Chunying Li, Heilongjiang (CN); Chunjian Zhao, Heilongjiang (CN); Yujie Fu, Heilongjiang (CN); Weiran Su, Heilongjiang (CN); Yuzheng Li, Heilongjiang (CN); Jiajing Guan, Heilongjiang (CN)

(73) Assignee: Northeast Forestry University, Heilongjiang (CN)

( * ) Notice: Subject to any disclaimer, the term of this patent is extended or adjusted under 35 U.S.C. 154(b) by 0 days.

(21) Appl. No.: 17/297,204

(22) PCT Filed: Jun. 10, 2020

(86) PCT No.: PCT/CN2020/095411
§ 371 (c)(1),
(2) Date: May 26, 2021

(87) PCT Pub. No.: WO2021/227168
PCT Pub. Date: Nov. 18, 2021

(65) Prior Publication Data
US 2021/0392827 A1    Dec. 23, 2021

(51) Int. Cl.
*A01C 21/00*    (2006.01)
*A01C 14/00*    (2006.01)

(52) U.S. Cl.
CPC ............ *A01C 21/005* (2013.01); *A01C 14/00* (2013.01); *Y02P 60/40* (2015.11)

(58) Field of Classification Search
CPC ........ A01C 21/005; A01C 14/00; Y02P 60/40
See application file for complete search history.

(56) References Cited

FOREIGN PATENT DOCUMENTS

| | | |
|---|---|---|
| CN | 1914994 A | 2/2007 |
| CN | 101147453 A | 3/2008 |
| CN | 1910994 B | 7/2010 |
| CN | 107006331 A | 8/2017 |
| CN | 104686172 B  * | 8/2018 |
| CN | 108770578 A | 11/2018 |
| WO | 03017754 A1 | 3/2003 |

OTHER PUBLICATIONS

International Search Report, dated Feb. 21, 2021, PCT Application No. PCT/CN20/95411.

* cited by examiner

*Primary Examiner* — Alicia Torres
(74) *Attorney, Agent, or Firm* — LeonardPatel PC; Sheetal S. Patel; Michael A. Leonard, II

(57) ABSTRACT

Provided is a method for planting a mixed forest of yew trees and fig trees. Yew trees and fig trees are interplanted based on characteristics of yew trees and fig trees. A seedling bed method is used in the plain zones, and a terrace field method is used in mountain zones in order to improve land utilization rate and make full use of complementary advantages of ecological niches. In the present disclosure, ground and underground spaces on tree growing site are fully used. Fig trees grow fast and have large leaves, thus shading part of sunlight for yew trees and savings costs required for building shade shelters for yew trees. By using the method for constructing a mixed forest in the present disclosure, the constructed mixed forest not only allows for increase of biomass, but also provides higher paclitaxel content in yew trees than that in pure forest.

19 Claims, No Drawings

METHOD FOR CONSTRUCTING A MIXED FOREST OF YEW TREES AND FIG TREES

CROSS-REFERENCE TO RELATED APPLICATIONS

This application is a national stage of PCT/CN20/95411 filed on Jun. 10, 2020, which claims the benefit of, and priority to, Chinese Patent Application No. 202010406489.8, entitled "Method for Constructing a Mixed Forest of Yew Trees and Fig Trees" filed with the China National Intellectual Property Administration on May 14, 2020, which is incorporated herein by reference in its entirety.

TECHNICAL FIELD

The present disclosure belongs to the technical field of yew afforestation, and specifically relates to a method for constructing a mixed forest of yew trees and fig trees.

BACKGROUND

The plant of yew genus (*Taxus*) is a first-rank protected plant. Yew trees like to grow in a skiophilous environment and grow slowly, usually planted in the shady hillside. If sunlight is enough, appropriate shading treatment is further needed at the earlier growth stage (1-3 years). Leave of yew tree contains pharmaceutical ingredients such as paclitaxel, a highly effective anti-cancer active ingredient. Due to its breeding characteristics, habitat conditions and human factors, its wild population has a poor renewal status and is now in an endangered state. Fig tree (*Ficus carica* L.) is a medicinal and food homologous plant of the genus *Ficus* of the Moraceae family, it is a perennial deciduous shrub or small tree that grows quickly, prefers a heliophilous environment. The fig tree has big branches and broad leaves. At present, the major breeding method for fig tree is cottage, allowing budding, differentiation, fruit drop in one year. The fruit of fig is very nutritious, and the development technology of fig tree breeding is constantly improving and becoming mature.

Paclitaxel extracted from yew trees has a unique anti-cancer mechanism. Following adriamycin and cisplatin, paclitaxel has been considered as an anti-cancer drug with good therapeutic effect on various cancers and causes minor side effects in recent years. For a long time to come, paclitaxel is one of the most powerful weapons for humans to fight cancer. Although China has yew trees resources accounting for more than half of yew trees in other countries all over the world, the demand for paclitaxel in the world is far from enough. Therefore, it is urgent to adopt appropriate methods to cultivate yew trees and establish a yew tree base for cultivating pharmaceutical raw material forest. Since young yew trees are not tolerant to strong sunlight, they are easily burned or even dried to death in the sun. Therefore, most yew tree seedlings need shade sheds to be built to reduce the sunlight intensity. However, construction of shade sheds by human power has the disadvantage of high cost, and there is no record of mixed afforestation of fig trees and yew trees.

SUMMARY OF THE DISCLOSURE

In view of this, the present disclosure provides a method for constructing a mixed forest of yew trees and fig trees. The constructed forest produces stable species relationship between the yew trees and the fig trees, which not only allows for promoting the growth rate of the yew trees significantly, but also increasing the content of paclitaxel in branches and leaves. Meanwhile the cultivation cost of yew trees is reduced.

In order to achieve the above-mentioned goal of the present disclosure, the following technical solution is provided.

The present disclosure provides a method for constructing a mixed forest of yew trees and fig trees, comprising:

interplanting yew trees and fig trees in mountain zone or plain zone, wherein the interplanting comprises strip interplanting in the mountain zone or the plain zone, or inter-plant interplanting in the plain zone;

in case of the strip interplanting, an east-to-west row orientation is adopted in the plain zone, and a strip of two-row yew trees are planted between every two adjacent strips of two-row fig trees; and in the mountain zone, the row orientation is parallel to the contour line;

and in case of the inter-plant interplanting, a rectangular arrangement is adopted.

In one embodiment of the present disclosure, in case of interplanting yew trees and fig trees in the mountain zone, the mountain zone is reformed into terrace fields having a trend that is parallel to the contour line, and each level of terrace has a width of 200-450 cm.

In one embodiment of the present disclosure, a row of fig tree strip and a row of yew tree strip are planted in the terrace fields of each level, and different tree species are planted in two adjacent rows in the terrace fields of adjacent two levels.

In one embodiment of the present disclosure, in case of the strip interplanting, the plant spacing in each row of fig trees is 150-200 cm, and the plant spacing in each row of yew trees is 60-100 cm.

In one embodiment of the present disclosure, when the strip interplanting is performed in the mountain zone, the row spacing of adjacent fig tree strip and yew tree strip is 150-200 cm in the terrace field at the same level; and the row spacing between the fig tree strip in terrace field at one level and the yew tree strip in the terrace field at another adjacent level is 200-250 cm.

In one embodiment of the present disclosure, when the strip interplanting is performed in the plain zone, the row spacing of adjacent fig tree strip and yew tree strip is 150-200 cm, and the plant spacing in each row of yew trees is 60-100 cm; the row spacing between adjacent yew trees strip is 150-200 cm; and the plant spacing in each row of yew trees is 150-200 cm.

In one embodiment of the present disclosure, the rectangular arrangement comprises planting a plant of yew tree between every two plant of adjacent fig trees, and the plant spacing between adjacent yew trees and the fig tree is 150-250 cm, and the row spacing is 200-300 cm.

The present disclosure also provides the use of the mixed forest constructed by the above construction method in increasing the biomass of yew trees and fig trees.

The present disclosure also provides the use of the mixed forest constructed by the above construction method in increasing the content of paclitaxel in yew trees.

Compared with the prior arts, the present disclosure has the following beneficial effects:

In the present disclosure, based on the characteristics of non-fast-growing, skiophilous nature, medium to deep root system of the yew trees, and the characteristics of fast-growing, heliophilous nature, and shallow root system of the fig trees, yew trees and fig trees are interplanted. A seedling bed method is used in the plain zones, and a terrace field method is used in mountain zones in order to improve land utilization rate and make full use of the complementary advantages of ecological niches. In the present disclosure, the ground and underground spaces on the tree growing site are fully used. Fig trees grow fast and have large leaves, thus shading part of sunlight for yew trees and savings costs required for building shade shelters for yew trees. In the method for constructing a mixed forest in the present disclosure, based on the characteristics that the relationship between yew trees and fig trees is reasonable (having the effect of inter-species synergy), the constructed mixed forest not only allows the increases of the biomass, but also the paclitaxel content in yew tree is higher than that in pure forest.

DETAILED DESCRIPTION OF THE EMBODIMENTS

The present disclosure will be further described below in conjunction with examples.

The present disclosure provides method for constructing a mixed forest of yew trees and fig trees, comprising:

interplanting yew trees and fig trees in mountain zone or plain zone, wherein the interplanting comprises strip interplanting in the mountain zone or the plain zone, or inter-plant interplanting in the plain zone. In case of the strip interplanting, an east-to-west row orientation is adopted in the plain zone, and a strip of two-row yew trees are planted between every two adjacent strips of two-row fig trees, and in the mountain zone, the row orientation is parallel to the contour line; and in case of the inter-plant interplanting, a rectangular arrangement is adopted.

In the present disclosure, yew and fig tree are interplanted in the mountain or plain zone, and the preferred species of yew trees include *Taxus chinesis* var. *mairei*, *Taxus cuspidata* and *Taxus media*. In the present disclosure, it is preferable to plant an annual yew trees with a height greater than 20 cm in the mountain or plain zone. The source of the yew trees is not particularly limited in the present disclosure, and conventional commercial seedlings in the field can be used. In the present disclosure, annual fig trees with a height greater than 40 cm are preferred. The source of the fig tree is not particularly limited in the present disclosure, and conventional commercial seedlings in the field can be used.

The mixed forest of the present disclosure can be constructed either in a mountain zone or in a plain zone (flat ground). When the mixed forest is constructed in a mountain zone, only the strip interplanting can be used. Preferably, the construction method includes reforming the mountain zone terrace fields having a trend that is parallel to the contour line, and each level of terrace has a width of 200-450 cm, and more preferably 400 cm. In the present disclosure, in case of construction the mixed forest in the terrace fields, it is preferable to plant a row of fig tree strip and a row of yew tree strip in the terrace fields of each level and plant different tree species in two adjacent rows in the terrace fields of adjacent two levels. In the present disclosure, when constructing the mixed forest in the terrace field, it is preferable to plant the fig tree on the outer edge of each level of the terrace field, and plant yew trees in the inner edge of the terrace field. When sun shines, most of the yew trees are located within the shadow formed by the leaves of the fig tree, avoiding direct sunlight from the sun, which facilitates growth of yew trees and reduces shading facilities required for planting of the yew trees, thus saving the costs. In the present disclosure, the plant spacing in each row of fig trees is preferably 150-200 cm, and the plant spacing in each row of yew trees is preferably 60-100 cm. In the present disclosure, when the strip interplanting is performed in the mountain zone, the row spacing of adjacent fig tree strip and yew tree strip is preferably 150-200 cm, more preferably 180 cm in the terrace field at the same level; and the row spacing between the fig tree strip in terrace field at one level and the yew tree strip in the terrace field at another adjacent level is 200-250 cm, more preferably 220 cm.

In the present disclosure, either strip interplanting or inter-plant interplanting can be used when constructing the mixed forest in the plain zone. When the strip interplanting is used, two rows of yew tree strip are planted between two adjacent rows of fig tree strip, with the plant spacing in each row of fig tree strip being preferably 150-200 cm, more preferably 180 cm, the plant spacing in each row of yew tree strip being preferably 60-100 cm, more preferably 80 cm. In the present disclosure, the row spacing between adjacent fig tree strip and yew tree strip is preferably 150-200 cm, more preferably 180 cm; the row spacing between two adjacent rows of yew tree strip is preferably 150-200 cm, more preferably 180 cm.

In the present disclosure, when inter-plant interplanting is used to construct the mixed forest in the plain zone, a rectangular arrangement is adopted, and it is preferred to include planting a plant of yew tree between every two plant of adjacent fig trees, and the plant spacing between adjacent yew trees and the fig tree is preferably 150-250 cm, and the row spacing is preferably 200-300 cm. In the rectangular arrangement of the present disclosure, it is preferable to plant in sequence fig tree-yew tree-fig tree-yew tree . . . in the first row, to plant in sequence yew tree-fig tree-yew tree-fig tree . . . in the second row, and to plant in sequence fig tree-yew tree-fig tree-yew tree . . . , and so on.

The mixed forest constructed by the method of the present disclosure allows a significant increase in the biomass of yew tree and fig tree as well as in the paclitaxel content in yew tree.

The present disclosure also provides the use of the mixed forest constructed by the above construction method in increasing the biomass of yew tree and fig tree. This use of the present disclosure is preferably the same as the above-mentioned method for constructing mixed forest, and will not be repeated herein.

The present disclosure also provides the use of the mixed forest constructed by the above construction method in increasing the content of paclitaxel in yew trees. The use of the present disclosure is preferably the same as the above-mentioned method for constructing the mixed forest, and will not be repeated here.

The method for constructing the mixed forest of yew trees and fig trees provided by the present disclosure will be described in detail below in conjunction with examples, but these examples should not be understood as limiting the protection scope of the present disclosure.

Example 1

A flat land that was formerly a corn field was divided into two plots with similar growing site conditions: the treated plot and the control plot, these two plots were treated differently. A strip mixed forest of yew trees and fig trees is constructed on the treated plots and a pure forest of yew trees is constructed on the control plots.

The treated plot was treated as follows: two rows of yew tree strip are planted between two adjacent rows fig trees, with the plant spacing in each row fig tree strip being 150 cm, and the plant spacing in each row of yew tree strip being 60 cm. The row spacing between adjacent fig tree strip and yew tree strip was 180 cm, and the row spacing between two adjacent rows of yew tree strip was 180 cm. The yew as used herein was a cuttage seedlings of a *Taxus chinesis* var. *mairei* tree that had a height of 20-30 cm, and the aged one cuttage seedlings of fig tree had a height 40-50 cm.

A single plant of *Taxus chinesis* var. *mairei* trees was planted in the control plot, a seedling bed approach was used and the seedling bed width was 200 cm. The *Taxus chinesis* var. *mairei Taxus chinesis* var. *mairei* trees were planted as per plant spacing and a row spacing of 60×60 cm. The yew trees as used were annual cuttage seedlings of *Taxus chinesis* var. *mairei* tree, and the seedling had a height of 20-30 cm.

In the treated plot, two years after, *Taxus chinesis* var. *mairei* trees were measured and the average tree height was 118 cm, the paclitaxel content in the leaves 21 ppm, the fig trees had an average height of 282 cm. In the control plot, the average tree height of *Taxus chinesis* var. *mairei* trees was 89 cm, and the paclitaxel content in the leaves was 18 ppm by HPLC, the average height of the fig trees was 286 cm. The statistical analysis results show that compared with the control plot, the height of *Taxus chinesis* var. *mairei* trees in the treated plot is 1.32 times that of the former, and the paclitaxel content in the leaves increases by 16.7%. There was no significant difference in fig yield between the two treatments.

Example 2

Terrace fields were constructed on the hillside, with width of each level of terrace field being 400 cm. The terrace field has a trend that is parallel to contour lines. In each level of terrace field were planted a row of fig tree strip and a row of yew tree strip, wherein the fig trees were planted at the side close to the mountain. In the terrace field of the same level, the row spacing between the adjacent fig tree strip and the yew tree strip was 180 cm. The row spacing between the fig tree strip in the terrace field at one level and the yew tree strip in adjacent terrace field at another level was 220 cm. The plant spacing in each row of yew tree strip was 80 cm, and the plant spacing in each row of fig tree strip was 180 cm. The yew tree as used was annual cuttage seedlings of *Taxus chinesis* var. *mairei* tree, the height of the seedlings was 20-30 cm, and the fig trees as used were annual cuttage seedlings of fig tree, and the height of seedlings was 40-50 cm.

After 2 years of afforestation, the average height of *Taxus chinesis* var. *mairei* trees was 20 cm, the average root depth was 33 cm, the average height of fig tree was 220 cm, and the average root depth was 70 cm. The paclitaxel content in the leaves of *Taxus chinesis* var. *mairei* trees in the mixed forest area was 22 ppm, increasing by 18.8% compared with the *Taxus chinesis* var. *mairei* trees in the single planting zone, and the environmental indicators in the forest were greatly improved compared with the single planting zone. The content of paclitaxel was also significantly higher than that of the single planting zone of *Taxus chinesis* var. *mairei* trees.

Example 3

A flat land that was formerly a wheat field was divided into two plots with similar growing site conditions: the treated plot and the control plot, these two plots were treated differently. On the treated plots, a rectangular arrangement was used for mixed afforestation by interplanting yew trees and fig trees and a pure forest of yew trees is constructed on the control plots.

The treated plot is treated as follows: a plant of yew tree was planted between two plants of adjacent fig trees, with the plant spacing between the yew tree and the row fig tree being 180 cm, and the row spacing being 250 cm. The yew as used herein was 4-years-old seed-borne seedlings of *Taxus cuspidata*, the height of the seedlings was 25-35 cm, and the annual cuttage seedlings of fig tree have a height 40-50 cm.

A single plant of *Taxus cuspidata* was planted in the control plot. *Taxus cuspidata* trees were planted as per plant spacing and row spacing of 180×250 cm. The yew trees as used were aged four cuttage seedlings of *Taxus cuspidata* tree, and the seedling had a height of 25-35 cm.

In the treated plot, two years after, *Taxus cuspidata* trees were measured and the average tree height was 106 cm, the paclitaxel content in the leaves 21 ppm, the fig trees had an average height of 329 cm. In the control plot, the average tree height of *Taxus cuspidata* trees was 85 cm, and the paclitaxel content in the leaves was 12 ppm when determined by a HPLC method, the average height of the fig trees was 326 cm. The statistical analysis results showed that compared with the control plot, the height of *Taxus cuspidata* trees in the treated plot was 1.28 times that of the former, and the paclitaxel content in the leaves increased by 13.2%.

Described above are only the preferred embodiments of the present disclosure. It should be pointed out that for those of ordinary skill in the art, several improvements and modifications can be made without departing from the principle of the present disclosure, and these improvements and modifications should also be regarded as the protection scope of the present disclosure.

What is claimed is:

1. A method for constructing a mixed forest of yew trees and fig trees, comprising:
   interplanting yew trees and fig trees in mountain zone or plain zone, wherein the interplanting comprises strip interplanting in the mountain zone or the plain zone, or inter-plant interplanting in the plain zone;
   in case of the strip interplanting, adopting an east-to-west row orientation in the plain zone, and planting a strip of two-row yew trees between every two adjacent strips of two-row fig trees; and in the mountain zone, the row orientation is parallel to the contour line;
   and in case of the inter-plant interplanting, adopting a rectangular arrangement.

2. The method according to claim 1, wherein in case of interplanting yew trees and fig trees in the mountain zone, reforming the mountain zone into terrace fields having a trend that is parallel to the contour line, and each level of terrace has a width of 200-450 cm.

3. The method according to claim 2, comprising planting a row of fig tree strip and a row of yew tree strip in the terrace fields of each level, and planting different tree species in two adjacent rows in the terrace fields of adjacent two levels.

4. The method according to claim 1, wherein in case of the strip interplanting, the plant spacing in each row of fig trees is 150-200 cm, and the plant spacing in each row of yew trees is 60-100 cm.

5. The method according to claim 4, wherein when the strip interplanting is performed in the mountain zone, the row spacing of adjacent fig tree strip and yew tree strip is 150-200 cm in the terrace field at the same level; and the row spacing between the fig tree strip in terrace field at one level and the yew tree strip in the terrace field at another adjacent level is 200-250 cm.

6. The method according to claim 1, when the strip interplanting is performed in the plain zone, the row spacing of adjacent fig tree strip and yew tree strip is 150-200 cm, and the plant spacing in each row of yew trees is 60-100 cm; the row spacing between adjacent yew trees strip is 150-200 cm; the plant spacing in each row of yew trees is 150-200 cm.

7. The method according to claim 1, wherein the rectangular arrangement comprises planting a plant of yew tree between every two plant of adjacent fig trees, and the plant spacing between adjacent yew trees and the fig tree is 150-250 cm, and the row spacing is 200-300 cm.

8. A method for increasing biomass of both yew trees and fig trees, comprising:
   interplanting yew trees and fig trees in mountain zone or plain zone, wherein the interplanting comprises strip interplanting in the mountain zone or the plain zone, or inter-plant interplanting in the plain zone;
   in case of the strip interplanting, adopting an east-to-west row orientation in the plain zone, and planting a strip of two-row yew trees between every two adjacent strips of two-row fig trees; and in the mountain zone, the row orientation is parallel to the contour line;
   and in case of the inter-plant interplanting, adopting a rectangular arrangement.

9. A method for increasing the content of paclitaxel in yew trees, comprising:
   interplanting yew trees and fig trees in mountain zone or plain zone, wherein the interplanting comprises strip interplanting in the mountain zone or the plain zone, or inter-plant interplanting in the plain zone;
   in case of the strip interplanting, adopting an east-to-west row orientation in the plain zone, and planting a strip of two-row yew trees between every two adjacent strips of two-row fig trees; and in the mountain zone, the row orientation is parallel to the contour line;
   and in case of the inter-plant interplanting, adopting a rectangular arrangement.

10. The method according to claim 8, wherein in case of interplanting yew trees and fig trees in the mountain zone, reforming the mountain zone into terrace fields having a trend that is parallel to the contour line, and each level of terrace has a width of 200-450 cm.

11. The method according to claim 10, comprising planting a row of fig tree strip and a row of yew tree strip in the terrace fields of each level, and planting different tree species in two adjacent rows in the terrace fields of adjacent two levels.

12. The method according to claim 8, wherein in case of the strip interplanting, the plant spacing in each row of fig trees is 150-200 cm, and the plant spacing in each row of yew trees is 60-100 cm.

13. The method according to claim 12, wherein when the strip interplanting is performed in the mountain zone, the row spacing of adjacent fig tree strip and yew tree strip is 150-200 cm in the terrace field at the same level; and the row spacing between the fig tree strip in terrace field at one level and the yew tree strip in the terrace field at another adjacent level is 200-250 cm.

14. The method according to claim 8, wherein when the strip interplanting is performed in the plain zone, the row spacing of adjacent fig tree strip and yew tree strip is 150-200 cm, and the plant spacing in each row of yew trees is 60-100 cm; the row spacing between adjacent yew trees strip is 150-200 cm; the plant spacing in each row of yew trees is 150-200 cm.

15. The method according to claim 8, wherein the rectangular arrangement comprises planting a plant of yew tree between every two plant of adjacent fig trees, and the plant spacing between adjacent yew trees and the fig tree is 150-250 cm, and the row spacing is 200-300 cm.

16. The method according to claim 9, wherein in case of interplanting yew trees and fig trees in the mountain zone, reforming the mountain zone into terrace fields having a trend that is parallel to the contour line, and each level of terrace has a width of 200-450 cm.

17. The method according to claim 9, wherein in case of the strip interplanting, the plant spacing in each row of fig trees is 150-200 cm, and the plant spacing in each row of yew trees is 60-100 cm.

18. The method according to claim 9, wherein when the strip interplanting is performed in the plain zone, the row spacing of adjacent fig tree strip and yew tree strip is 150-200 cm, and the plant spacing in each row of yew trees is 60-100 cm; the row spacing between adjacent yew trees strip is 150-200 cm; the plant spacing in each row of yew trees is 150-200 cm.

19. The method according to claim 9, wherein the rectangular arrangement comprises planting a plant of yew tree between every two plant of adjacent fig trees, and the plant spacing between adjacent yew trees and the fig tree is 150-250 cm, and the row spacing is 200-300 cm.

* * * * *